(12) United States Patent
Drabant et al.

(10) Patent No.: US 8,260,762 B2
(45) Date of Patent: Sep. 4, 2012

(54) GENERIC DATA LIST MANAGER

(75) Inventors: Bernhard Drabant, Muehlhausen (DE); Uwe Bloching, Nussloch (DE)

(73) Assignee: SAP AG, Walldorf (DE)

( * ) Notice: Subject to any disclaimer, the term of this patent is extended or adjusted under 35 U.S.C. 154(b) by 917 days.

(21) Appl. No.: 12/335,516

(22) Filed: Dec. 15, 2008

(65) Prior Publication Data

US 2010/0153976 A1 Jun. 17, 2010

(51) Int. Cl.
*G06F 17/00* (2006.01)
(52) U.S. Cl. .................................. 707/705; 719/327
(58) Field of Classification Search .................. 707/705; 719/327
See application file for complete search history.

(56) References Cited

U.S. PATENT DOCUMENTS 5,495,608 A * 2/1996 Antoshenkov ................. 1/1

* cited by examiner

*Primary Examiner* — Belix M Ortiz Ditren
(74) *Attorney, Agent, or Firm* — Brake Hughes Bellermann LLP

(57) ABSTRACT

Example methods and apparatus for storing and providing application runtime data are disclosed. An example method include receiving, at a data list manager, a set of identifiers associated, respectively, with one or more persistently stored structured data records. The example method further includes storing, by the data list manager, the set of identifiers. The example method also includes receiving, at the data list manager, a request for one or more of the structured data records and retrieving, by the data list manager, the one or more requested structured data records. The example method still further includes storing, by the data list manager, the retrieved data records in correspondence with their respective identifiers and providing, by the data list manager, the retrieved data records for display to a user.

19 Claims, 7 Drawing Sheets

GENERIC DATA LIST MANAGER

TECHNICAL FIELD

This description relates to storing and management of application runtime data.

BACKGROUND

Software applications that are used in conjunction with databases, such as databases containing business data, process large amounts of data at runtime. For instance, a user may employ a user interface (UI) application, which may be referred to as a consumer application, to view entries in a database. For example, a consumer application may be used to view employee records in a corporate database. In another example, a consumer application may be used to view entries in telephone directory for a city or geographic region. Such databases may contain extremely large numbers of records or entries.

In current approaches, when a consumer application accesses a database with a query, all the records matching that query are typically transferred to the consumer application for runtime storage on a local computer on which the consumer application is running. Depending on the size of the database and the terms of the database query, the amount of data transferred for runtime storage can be quite large. In cases where a user is only interested in viewing a single record or a small subset of the records matching his or her initial query, the majority of the bandwidth and memory utilized to transfer and store the records for runtime is wasted and could be used for other applications running on the local computer and over a network connecting the consumer application and the database.

DETAILED DESCRIPTION

Figure 1:
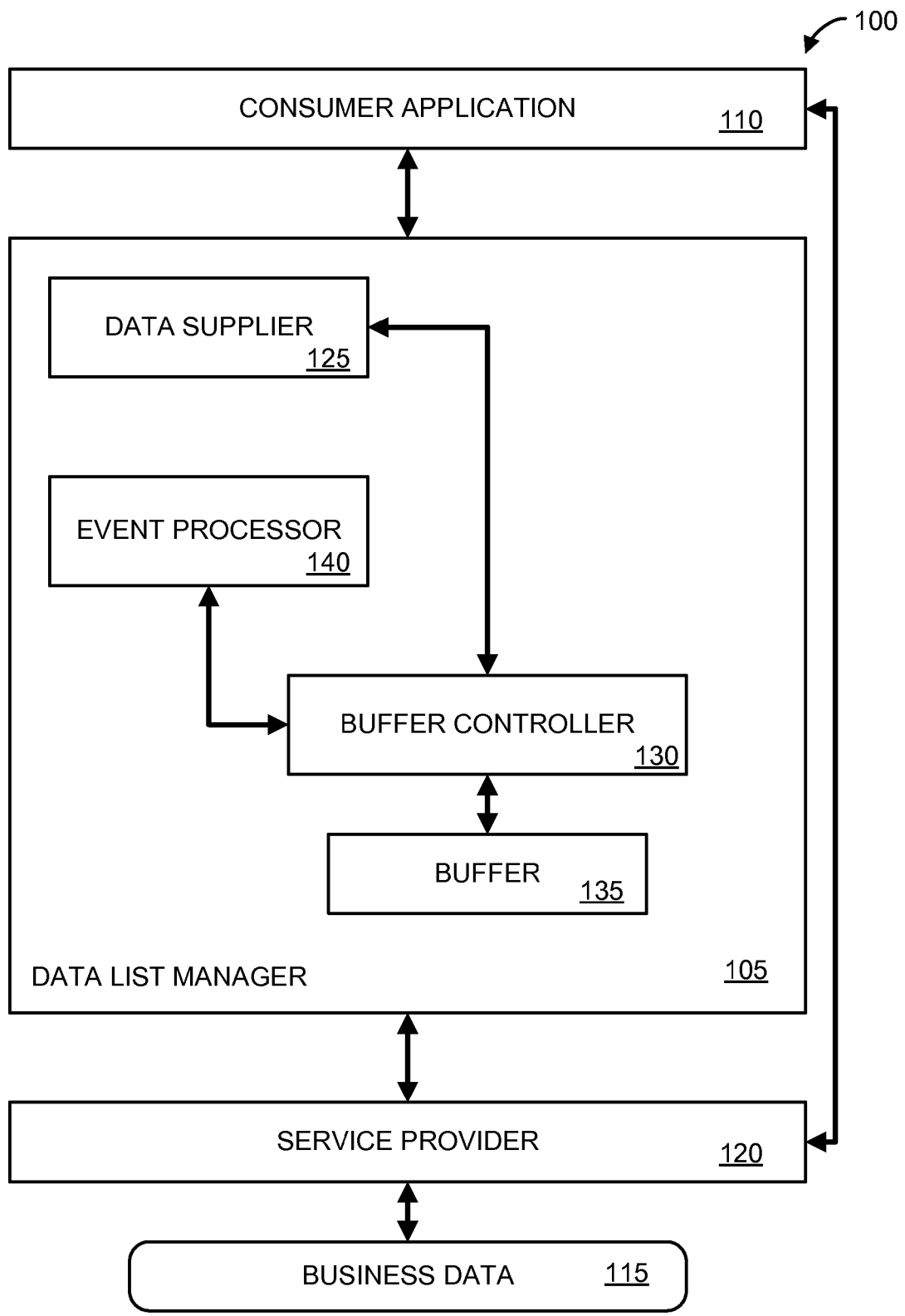
FIG. 1 is a block diagram illustrating a system for storing and providing application runtime data records for a consumer application in accordance with an example embodiment.

FIG. 1 is a block diagram of a system 100 for storing and providing application runtime data records for a consumer application in accordance with an example embodiment. In the system 100, the application runtime data records may correspond with data records that are persistently stored in a database.

The system 100 includes a data list manager 105 that is operationally coupled with a consumer application 110. The data list manager 105 may be used to retrieve and store database records from a database 115 for runtime use by the consumer application 110. In the system 100, the data list manager 105 is further operationally coupled with a service provider 120 that may act as an interface between the data list manager 105 and the database 115. In an example embodiment, the consumer application 110 may determine a set of identifiers, e.g., in accordance with selection criteria provided by a user. This set of identifiers may be provided to the database 115 (out of band from the data list manager 105). The database 115 may then provide the set of identifiers, without the associated data records, to the data list manager 105 via the service provider 120. The data list manager 105 may then stored the identifiers corresponding with the request. Such an approach may save a substantial amount of processing time and memory usage, as only the identifiers corresponding with the request (which could number in the tens of thousands, for example), not the entire data records corresponding with those identifiers.

The consumer application 110 may then send a request to the data manager 105 for specific database records that a user of the consumer application 110 wishes to view. Such a request may include only the identifiers of the data records the user wishes to view, such as a list of particular rows, for example. In an example embodiment, such a request from the consumer application 110 to the data list manager 105 is substantially different than a database request or query, as such database query contain complex database statements to describe a set of data records rather than just a set of identifiers. The data list manager 105, in response to such requests from the consumer application 110, may then request the specific database records from the service provider 120. The service provider 120 may, in turn, retrieve the requested database records from the database 115, where the data records are persistently stored in the database 115. The service provider 120 may then provide the retrieved records to the data list manager 105. The data list manager 105, in turn, may store the requested data records received from the service provider 120 as application runtime data records for the consumer application 110 and provide those stored application runtime data records to the consumer application 110 for viewing by the using on a computer running the consumer application 110, for example.

In the system 100, the data list manager 105 includes a data supplier 125. The data supplier 125 of the system 100 may be configured to receive a first set of metadata from the consumer application 110, where the first set of metadata defines a data record structure for application runtime data records to be viewed using the consumer application 110. In an example embodiment, such data records may be homogenous in structure. In other embodiments, the first metadata may define multiple data record structures for application runtime data records to be viewed using the consumer application 110. For purpose of this disclosure, application runtime data records will be described as having a homogenous structure, such as discussed in further detail below with reference to FIG. 7. It will be appreciated, however, that the embodiments described herein may also be used for storing and providing data records having heterogeneous structures.

In the system 100, the data supplier 125 may be further configured to receive a second set of metadata, where the second set of metadata defines identifiers for the application runtime data records. The identifiers of the application runtime data records may take a number of forms. For example, the identifiers may be numeric. In another example, the identifiers may be text fields, such as employee names in the case of a corporate employee database. In the system 100, the identifiers may correspond with identifiers used to index data records in the database 115, for example, the same identifiers may be used in the data list manager 105 as are used in the database 115. As with the first set of metadata, the second set of metadata may also be provided to the data list manager 105 by the consumer application 110. In another example embodiment, the first and second metadata may be provided in a single set of metadata.

In the system 100, the data supplier 125 may be further configured to retrieve application runtime data records requested by the consumer application 110. For instance, the data supplier 125 may receive a request for specific data records that are persistently stored in the database 115. The data supplier 125 may then communicate that request to the service provider 120. The service provider 120 may then retrieve the requested data records from the database 115 and provide the retrieved data records to the data supplier 125 for storage in the data list manager 105 as application runtime data records. The data supplier 125 may be further configured to provide the application runtime data records to the consumer application 110 in response to the consumer application 110's request for the records.

In the system 100, the data supplier 125 may also be configured to receive third metadata defining enriched application data fields for the application runtime data records. In an example embodiment, the enriched application data fields may be user readable fields corresponding with one or more respective coded fields of the application runtime data records retrieved from the database 115. For instance, country indications may be saved in persistently stored data records using standard two letter country codes. Such a country code may be converted to user readable form using any of the approaches described herein. For example, a country code of 'DE' may be converted to an enriched data value of 'Germany' if the consumer application 110 is operating in an English language context. Alternatively, the country code of 'DE' may be converted to an enriched value of 'Deutschland' if the consumer application 110 is operating in a German language context.

The third metadata may also be provided by the consumer application 110. In another example embodiment, the consumer application may provide the data supplier 125 with information describing an enriched data handler. The data supplier 125 may then request the third metadata from the enriched data handler. The enriched data handler may be implemented in the consumer application 110, the service provider 120 or any other appropriate entity for converting data fields of the persistently stored data records of the database 115 to the enriched data fields. In the system 100, the enriched data fields may be stored in the data list manager 105 with (as part of) their corresponding application runtime data records. Such an approach allows for runtime conversion of coded fields in the persistently stored data records, thus allowing for efficient storage of data records in the database 115 by using coded fields an eliminating the need to store redundant information the database 115, e.g., the converted enriched data values.

The system 100 may further include a buffer controller 130 that is operationally coupled with the data supplier 125 and a data buffer 135. The data buffer 135 may be used for storing runtime data application records that are retrieved from the database 115 along with any associated enriched data fields. In the system 100, the buffer controller 130 may be configured to provision the data buffer 130 for storing the retrieved application runtime data records in accordance with the first set of metadata and the second set of metadata. For instance, the buffer controller 130 may use the first and second sets of metadata to provision the data buffer 135 as a table, where each row of the table is used to store a single application runtime data record. In an example embodiment, each row of such a table in the buffer 135 may include a plurality of data fields, where the data fields include corresponding fields to fields of the data records that are persistently stored in the database 115.

Each row of an application runtime data record table in the buffer 135 may also include additional fields for storing enriched application data (e.g., human readable values corresponding with coded fields of the persistently stored data records, as discussed above and in further detail below) and one or more fields indicating the state of the application runtime data records stored in the buffer (e.g., fields indicating whether the runtime data records are in sync or out of sync with their corresponding persistently stored data records in the database 115).

In the system 100, the buffer controller 130 may be further configured to receive, from the data supplier 125, and store, in the buffer 135, identifiers corresponding with the application runtime data records. These identifiers may be stored in the buffer 135 in accordance with the provisioning of the buffer based on the first set of metadata and/or the second set of metadata.

The buffer controller 130 may be further configured to receive, from the data supplier 125, and store, in the buffer 135, the data records retrieved by the data supplier 125 from the database 115. The retrieved data records may be stored in the buffer 135 as application runtime data records in correspondence with their respective identifiers in the table, such as in accordance with the provisioning based on the first and second sets of metadata. Additionally, the buffer controller 130 may be configured to receive, from the data supplier 125, and store, in the buffer 135, enriched data fields. The enriched data fields may be stored in the buffer 135 in accordance with the provisioning of the application runtime data record table based on the third set of metadata as was described above.

In the system 100, the buffer controller 130 may be additionally configured to receive buffer actions, where a buffer action includes an indication that one or more of the application runtime data records stored in the data buffer 135 are out of sync with their corresponding persistently stored data records in the database 115. In such a situation, if the consumer application 110 requests an application runtime data record that is marked in the buffer 135 as being out of sync with the database 115, the data list manager 105 may retrieve the updated data record from the database 115 and store the updated data record in the data buffer 135 prior to providing the requested application runtime data record to the consumer application 110. If the runtime data application record table stored in the data buffer 135 includes enriched data fields, the data list manager 105 may also contact the enriched data handler (e.g., via the data supplier 125) to update the enriched data fields before providing the requested application runtime data record to the consumer application 105.

In the system 100, a buffer action may also indicate that one or more persistently stored data records have been deleted from the database 115. In this situation, the buffer controller 130, in response to the buffer action, may delete corresponding application runtime data records from the table stored in the buffer 135.

The system 100 also includes an event processor 140 that is operationally coupled with the buffer controller 130. In the system 100, the event processor 140 may be configured to receive events, e.g., from the service provider 120, that indicate changes to persistently stored data records in the database 115, such as modifications to persistently stored data records or removal of persistently stored data records. The event processor 140 may then translate the events received from the service provider 120 to buffer actions that can be interpreted by the buffer controller 130. The event processor may then communicate the buffer actions to the buffer controller 130 to provide notification of the events received from the service provider 120 to the buffer controller 130. The buffer controller 130 may then take appropriate action in response to the events received by the event processor 140 and translated to buffer actions. In other example embodiments, the buffer controller 130 may directly receive and interpret events regarding changes in the persistently stored data records in the database 115.

In the system 100, the data list manager 105 may be further configured to sort application runtime data records stored in the data buffer 135. For example, the data list manager 105 may receive a request, e.g., from the consumer application 110, to sort the application runtime data records stored in the data buffer 135. The sort request may include indications of one or more sort columns and corresponding sort directions. For instance, a sort request may indicate that the runtime data application records of an employee database are to first be sorted by country in descending order and then be sorted by employee name in ascending order. Of course, additional or fewer sort columns and sort directions may be indicated in such a sort request.

In the system 100, after receiving the sort request, the data list manager 105 may retrieve each of the application runtime data records corresponding with the list of identifiers stored in an application runtime data record table stored in the buffer 135. This may include retrieving modified application runtime data records marked as out of date in the buffer 135 and retrieving persistently stored data records that have not been previously stored in the buffer 135. After each of the runtime data records has been retrieved and stored in the buffer 135, the data list manager 105 (e.g., using the buffer controller 130) may sort the application runtime data records in accordance with the sort request.

Further in the system 100, the data list manager 105 may also be configured to perform additional operations related to application runtime data records stored in the buffer 135. For instance, the data list manager 105 may be configured to determine a number of application runtime data records stored in the buffer 135, mark all application runtime data records stored in the buffer 135 as out of date and delete all application runtime data records stored in the buffer 135.

Figure 2:
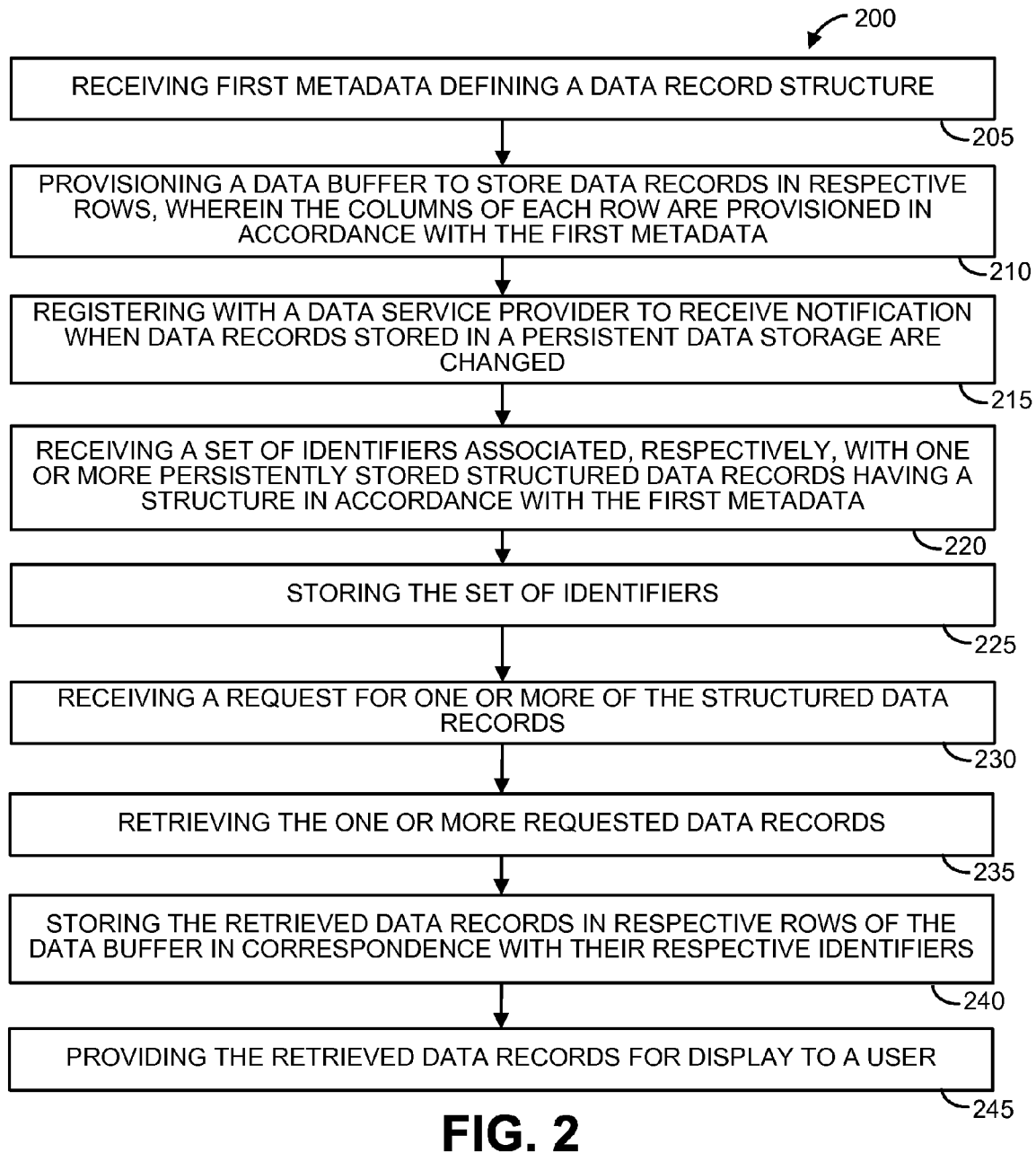
FIG. 2 is a flowchart illustrating a method for providing application runtime data records to a consumer application in accordance with an example embodiment.

FIG. 2 is a flowchart illustrating a method 200 for providing application runtime data records to a consumer application in accordance with an example embodiment. The method 200 may be implemented in the system 100 and, for purposes of illustration, will be described with further reference to FIG. 1. It will be appreciated, however, that the method 200 may be implemented in a number of other appropriate system configurations.

The method 200 includes, at block 205, receiving, at the data list manager 105, first metadata defining a data record structure. As discussed above, the data record structure defined in the first metadata may correspond with the structure of data records that are persistently stored in the database 115. The method 200, at block 210, includes provisioning the data buffer 135 to store data records in respective rows, such as in an application runtime data record table. For instance, the columns of each row of the table in the buffer 135 may be provisioned in accordance with the first metadata. The method 200 may also include, at block 215, the data list manager 105 registering with the service provider 120 to receive notification when data records stored in the data service provider are changed (e.g., modified or deleted).

At block 220, the method 200 includes receiving, at the data list manager 105, a set of identifiers associated, respectively, with one or more structured data records that are persistently stored in the database 115. In the method 200, the persistently stored data records may have a structure that is also in accordance with the first metadata and the rows of the application runtime data record table implemented in the buffer 135. At block 225, the method 200 includes storing the set of identifiers in the buffer 135 using, for example, the buffer controller 130.

In an example embodiment, the identifiers may be provided to the data list manager 105 in response to a database query that is made by the consumer application 110 directly to the service provider 120 (bypassing the data list manager 105 with the query). For instance, a query requesting all employees in a corporate database that are listed as being located in the United States may be passed from the consumer application 110 to the service provider 120. In response to this query, the service provider 120 may retrieve the identifiers for all matching records in the database 115 and provide those identifiers (not the entire records) to the data list manager 105.

At block 230, the method 200 includes receiving, at the data list manager 105, a request for one or more of the persistently stored structured data records, where the request may be provided to the data list manager 105 by the consumer application 110. In response to the request, the method 200 includes, at block 235, retrieving, such as by the data supplier 125, the one or more requested data records. As discussed above, the data supplier 125 may retrieve the requested data records by sending a request to the service provider 120. At block 240, the method 200 includes storing the retrieved data records as application runtime data records in respective rows of the data buffer 135, where the application runtime data records are stored in the buffer 135 in correspondence with their respective identifiers.

At block 245, the method 200 includes providing the retrieved data records, e.g., to the consumer application 110, for display to a user. As discussed above, the provided application runtime data records may be viewed by a user on a computer that is running the consumer application 110, such as a UI application.

In the method 200, the request for specific application runtime data records may take a number of forms. For example, the request may specify the requested records by including a specific data record identifier for an application runtime data record of interest. For instance, the request may provide the name of a person for which the user wishes to view telephone directory information. In another example, the request may indicate a set of data record identifiers. For instance, the request may include a set of employee names from a corporate database which the user wishes to view. In still other example embodiments, the request may include a line interval specifying a block of rows of application runtime data records stored in the buffer 135 or may indicate a discontinuous set of line numbers specifying specific rows of application runtime data records stored in the buffer 135.

The approaches described herein, such as the method 200, implement a technique which may be referred to as "lazy loading." As described above, in such an approach, only the identifiers for records matching a query are initially provided to the data list manager 105. The data list manager 105 does not retrieve entire persistently saved data records and save them as application runtime data records until the user requests those records for viewing. Such approaches may have significant performance advantages over prior techniques, as they will save bandwidth and reduce memory usage as compared to techniques where entire data records are retrieved and saved as application runtime data records in response to a database query.

Figure 3:
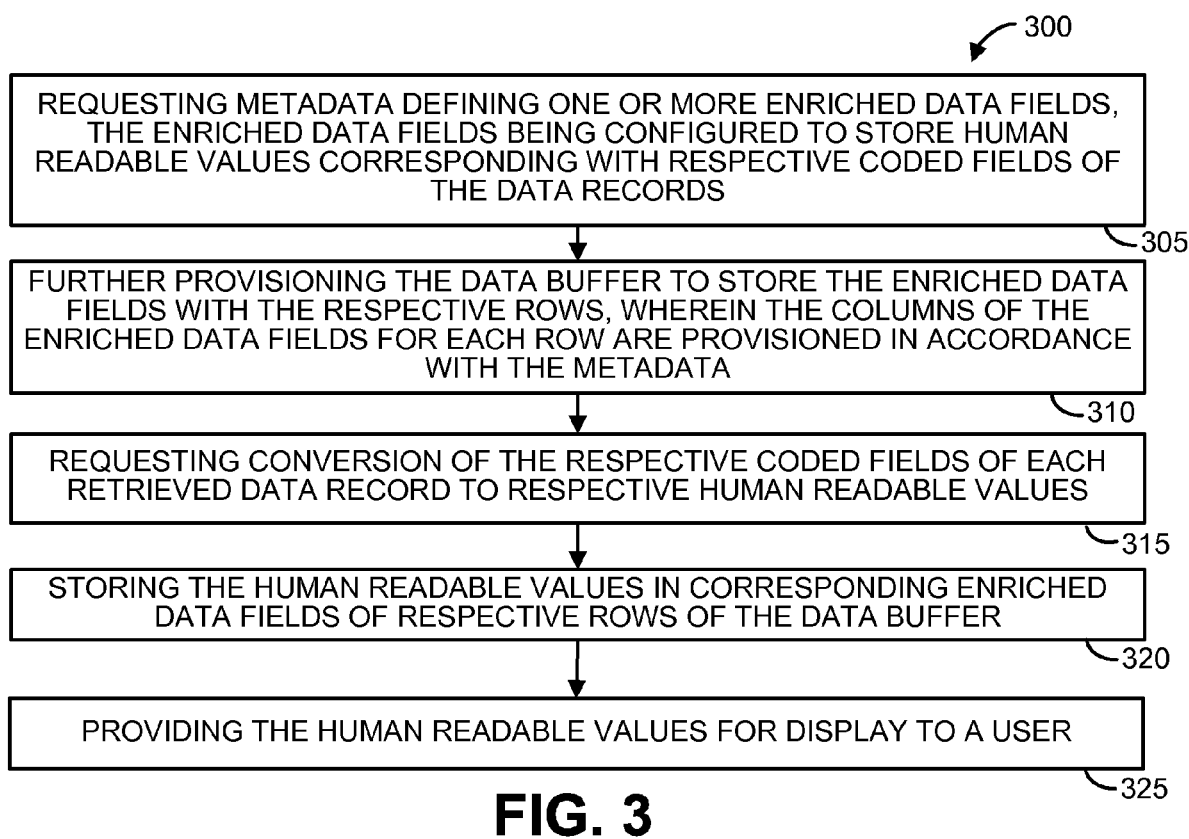
FIG. 3 is a flowchart illustrating a method for providing enriched application data to a consumer application in accordance with an example embodiment.

FIG. 3 is a flowchart illustrating a method 300 for providing enriched application data to a consumer application in accordance with an example embodiment. The method 300 may be implemented in the system 100 and, for purposes of illustration, will be described with further reference to FIG. 1. It will be appreciated, however, that the method 300 may be implemented in a number of other appropriate system configurations.

The method 300 includes, at block 305, requesting, such as by the data supplier 125, metadata defining one or more enriched data fields. The metadata may be obtained from the consumer application 110, from the service provider 120 or from an enriched data supplier, as was previously discussed. In an example embodiment, the enriched data fields may be configured to store human readable values that correspond with respective coded fields of persistently stored data records of the database 115.

The method 300 includes, at block 310, further provisioning, by the buffer controller 130, the data buffer 135 to store the enriched data fields with their respective rows in an application runtime data record table. For instance, the columns of the enriched data fields for each row may be provisioned in accordance with the metadata defining the enriched data fields.

The method 300 further includes, at block 315, requesting, such as by the data supplier 125, conversion of the respective coded fields of each retrieved data record to corresponding human readable values or enriched data values, such as converting country codes to country names. As previously discussed, such conversion may be done by the consumer application 110, the service provider 120, by a discrete enriched data handler, or by any appropriate technique, such as a lookup table.

The method 300 also includes, at block 320, storing, such as by the buffer controller 130, the human readable values in corresponding enriched data fields of respective rows of the data buffer 135. At block 325, the method 300 includes providing the human readable values from the data list manager 105 to the consumer application 110 for display to a user. The approaches described herein for enriching data fields of persistently stored data records for use as application runtime data may also be employed when a persistently stored data record is modified and re-retrieved by the data list manager 105. For instance, the data supplier 125 may retrieve a modified data record corresponding with an application runtime data record stored in the buffer 135. The data supplier 125 may then provide the modified data record to the buffer controller 130 for storage in the appropriate row of the buffer 135. The data supplier 125 may also retrieve any enriched data fields associated with the modified data record and provide those to the buffer controller 130 for storage with the modified application runtime data record in the corresponding row of the buffer 135.

Figure 4:
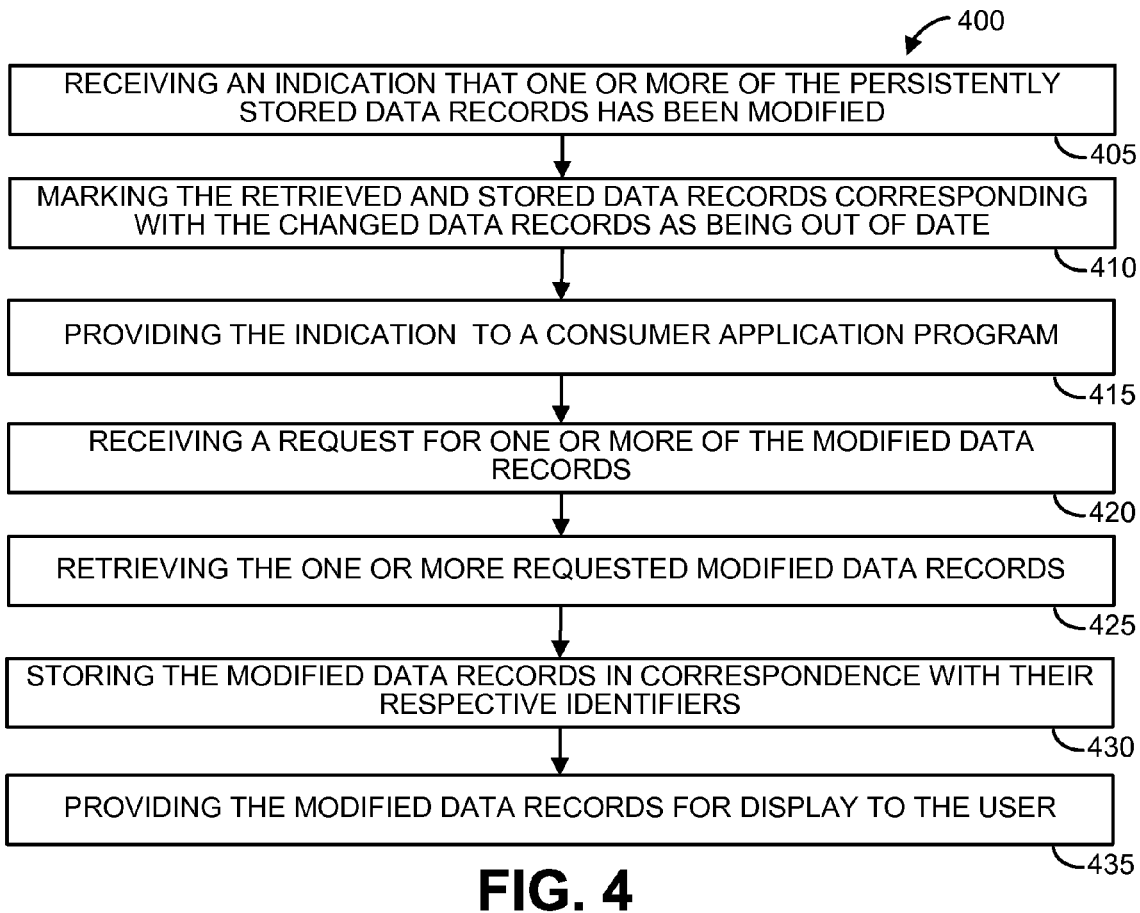
FIG. 4 is a flowchart illustrating a method for providing modified application runtime data records to a consumer application in accordance with an example embodiment.

FIG. 4 is a flowchart illustrating a method 400 for providing modified application runtime data records to a consumer application in accordance with an example embodiment. The method 400 may be implemented in the system 100 and, for purposes of illustration, will be described with further reference to FIG. 1. It will be appreciated, however, that the method 400 may be implemented in a number of other appropriate system configurations.

The method 400, at block 405, includes receiving, e.g., at the event processor 140, an indication that one or more of the persistently stored data records has been modified. The event processor 140 may interpret the received event and generate an appropriate buffer action, which is then provided to the buffer controller 130, for example. In another example embodiment, the buffer controller 130 may directly receive and interpret the event. In response to the event and/or buffer action, the method 400 includes, at block 410, marking the retrieved and stored data records corresponding with the changed data records as being out of date. Such marking may be done by the buffer controller 130 using respective status fields of the corresponding rows of the buffer 135. At block 415, the data list manager 105 may provide the indication of modified data records in the database 115 to the consumer application 110.

At block 420, the method 400 includes the data list manager 105 receiving a request from the consumer application 110 for one or more of the modified data records. This request may or may not be made in response to the consumer application 110 receiving the event notification at block 415. In response to the request at block 420, the method includes, at block 425, retrieving, e.g., by the data supplier 125, the one or more requested modified data records. At block 430, the method 400 includes storing, e.g., by the buffer controller 130, the modified data records in correspondence with their respective identifiers, such as in respective rows in an application runtime data record table implemented in the buffer 135. At block 435, the method 400 includes providing the modified data records to the consumer application 110 for display to the user.

Figure 5:
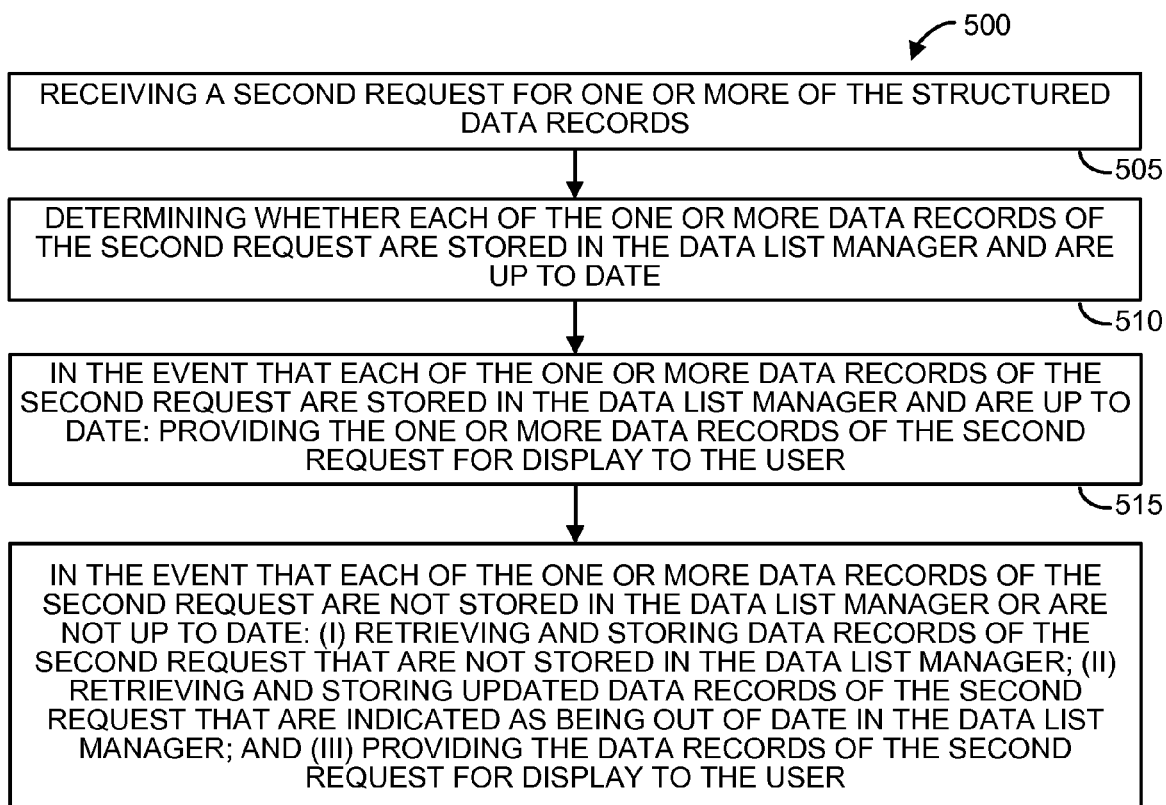
FIG. 5 is a flowchart illustrating another method for providing modified application runtime data records to a consumer application in accordance with an example embodiment.

FIG. 5 is a flowchart illustrating another method for providing modified application runtime data records to a consumer application in accordance with an example embodiment. The method 500 may be implemented in the system 100 and, for purposes of illustration, will be described with further reference to FIG. 1. It will be appreciated, however, that the method 500 may be implemented in a number of other appropriate system configurations.

In the method 500, persistently stored structured data records have been previously requested by the consumer application 110, retrieved from the database 115 by the data supplier 125 and stored in the buffer 135 of the data list manager 105. In that context, the method 500 includes, at block 505, receiving, at the data list manager 105, a second request for one or more of the previously saved application runtime data records. At block 510, the method 500 includes determining whether each of the one or more data records of the second request are stored in the data list manager and are up to date, such as based on respective status fields of corresponding rows in the buffer 135.

At block 515, in the event that each of the one or more data records of the second request are stored in the buffer 135 and are up to date, the method 500 includes providing, by the data list manager 105, the one or more data records of the second request to the consumer application 110 for display to the user.

In the event that each of the one or more data records of the second request are not stored in the buffer 135 of the data list manager 105, or are not up to date (are out of sync with the database 115), the method 500 includes, at block 520 retrieving, by the data supplier 125, and storing, by the buffer controller 130 in the buffer 135, the data records of the second request that are not stored in the data list manager 105. The method 500 also includes, at block 520, retrieving, by the data supplier 125, and storing, by the buffer controller 130 in the buffer 135, updated data records of the second request that are indicated as being out of date in the buffer 135. The method 500 further includes, at block 520, providing, by the data list manager 105, the data records of the second request to the consumer application 110 for display to the user.

Figures 6, 7:
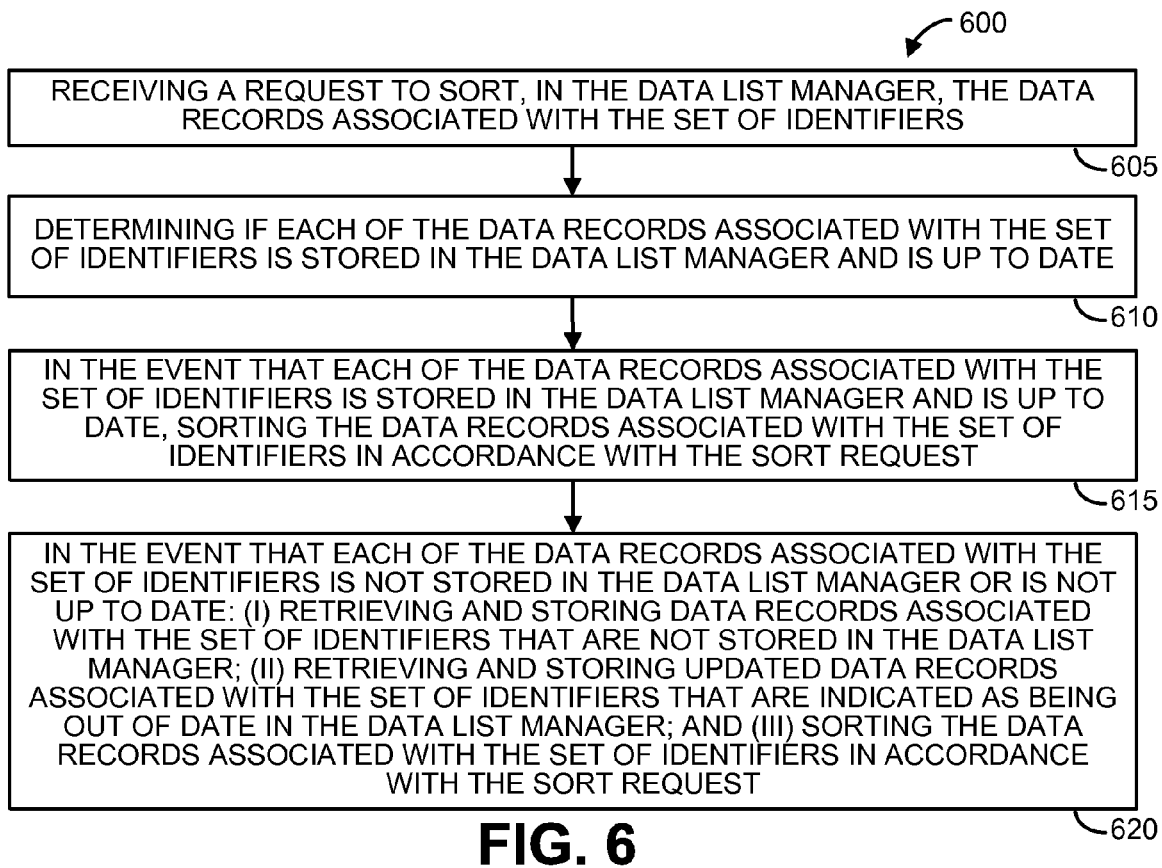
FIG. 6 is a flowchart illustrating a method of sorting application runtime data records stored in a data list manager in accordance with an example embodiment.
FIG. 7 is a diagram illustrating the structure of an application runtime data record that may be included as a row in an application runtime data record table in accordance with an example embodiment.

FIG. 6 is a flowchart illustrating a method 600 of sorting application runtime data records stored in a data list manager in accordance with an example embodiment. The method 600 may be implemented in the system 100 and, for purposes of illustration, will be described with further reference to FIG. 1. It will be appreciated, however, that the method 600 may be implemented in a number of other appropriate system configurations.

The method 600 includes, at block 605, receiving, at the data list manager 105, a request, e.g., from the consumer application 110, to sort data records associated with a list of identifiers that are stored in the buffer 135. In the method 600, the request may include indications of one or more sort columns and corresponding sort directions, such as in the fashion that was previously described. At block 610, the method 600 includes determining, by the data list manager 105, if each of the data records associated with the set of identifiers are stored in the buffer 135 and are up to date. At block 615, in the event that each of the data records associated with the set of identifiers are stored in the buffer 135 and are indicated as being up to date, the method 600 includes sorting, the data records in the buffer 135, e.g., with the buffer controller 130, in accordance with the sort request.

At block 620, in the event that each of the data records associated with the set of identifiers are not stored in the buffer 135 of the data list manager 105, or are not up to date, the method 600 includes retrieving, e.g., by the data supplier 125, and storing, e.g., by the buffer controller 130, data records associated with the set of identifiers that are not stored in the data list manager 105. The method 600 further includes, at block 620, retrieving and storing updated data records associated with the set of identifiers that are indicated as being out of date in the data list manager 105. After retrieving missing and updated data records from the database 115, the method 600 includes, at block 620 sorting, e.g., with the buffer controller 130, the data records stored in the buffer 135 in accordance with the sort request.

FIG. 7 is a diagram illustrating the structure of an application runtime data record 700 that may be included as a row in an application runtime data record table in accordance with an example embodiment. The record 700 includes an identifier field 705. As previously discussed, the identifier field 705 may correspond with identifiers of data records that are persistently stored in a database. The identifiers 705 stored in the records 700, as was discussed above, may be provided to a data list manager in response to a database query. Each row of an associated application runtime data record table may include a record 700 and be uniquely identified by its identifier filed 705.

The record 700 also includes fundamental application data 710. The fundamental application data may include a plurality of data fields that are defined in metadata provided to a data list manager, such as in the fashions that were previously described. The data fields of the fundamental application data 710 may directly correspond with the data fields of corresponding persistently stored data records in a database.

The record 700 further includes enriched data 715. The enriched data 715 may include one or more enriched data fields, as were discussed above. For instance, the enriched data 715 may include one or more enriched data fields that are used to store human readable values corresponding with one or more coded values included in the fundamental application data 710 for a respective record 700.

The record 700 may also include a status field 720. The status field 720 may be used to store an indication whether a given record 700 is in sync or out of sync with a corresponding persistently stored record in a database. The status field 720 may be a single bit Boolean logic field with '0' indicating the corresponding record 700 is out of sync (or out of date) and '1' indicating the corresponding record 700 is in sync (up to date). The value of the status field 720 may be changed when a record 700 is stored in a data list manager to indicate that the record 700 is up to date. The status field 720 may also be changed in response to an event or buffer action indicating the record 700 is out of sync (out of date) with respect to a corresponding persistently stored data record. Also, the record 700 may include other information or may eliminate one or more of the elements shown in FIG. 7. Other approaches for indicating the status of the record 700 may also be used, such as using a text field instead of a Boolean logic field.

Figure 8:
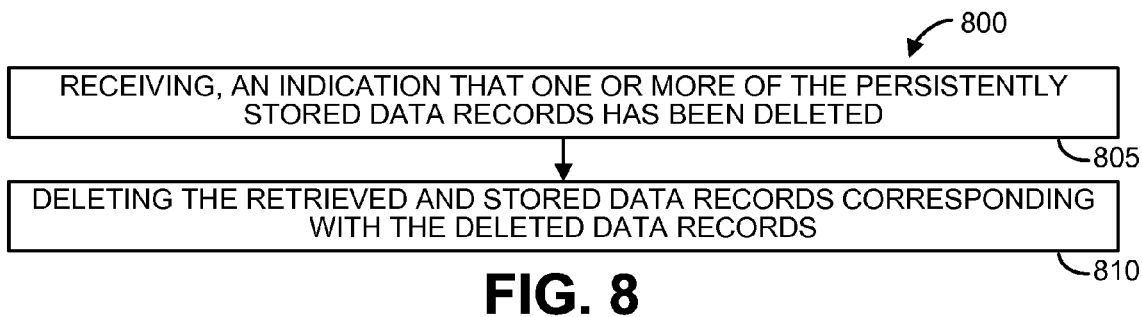
FIG. 8 is a flowchart illustrating a method of deleting an application runtime data records in accordance with an example embodiment.

FIG. 8 is a flowchart illustrating a method 800 of deleting application runtime data records in accordance with an example embodiment. The method 800 may be implemented in the system 100 and, for purposes of illustration, will be described with further reference to FIG. 1. It will be appreciated, however, that the method 800 may be implemented in a number of other appropriate system configurations.

The method 800 includes, at block 805, receiving, e.g., at the event processor 140 of the data list manager 105, an indication that one or more of the persistently stored data records in the database 115 has been deleted. As previously described, the event processor 140 may interpret the even and generate a buffer action that is then provided to the buffer controller 130 to indicate the record or records that have been deleted from the database 115. The method 800 also includes, at block 810, deleting, e.g., by the buffer controller 130, retrieved and stored data records in the buffer 135 that correspond with the deleted data records indicated at block 805.

Figure 9:
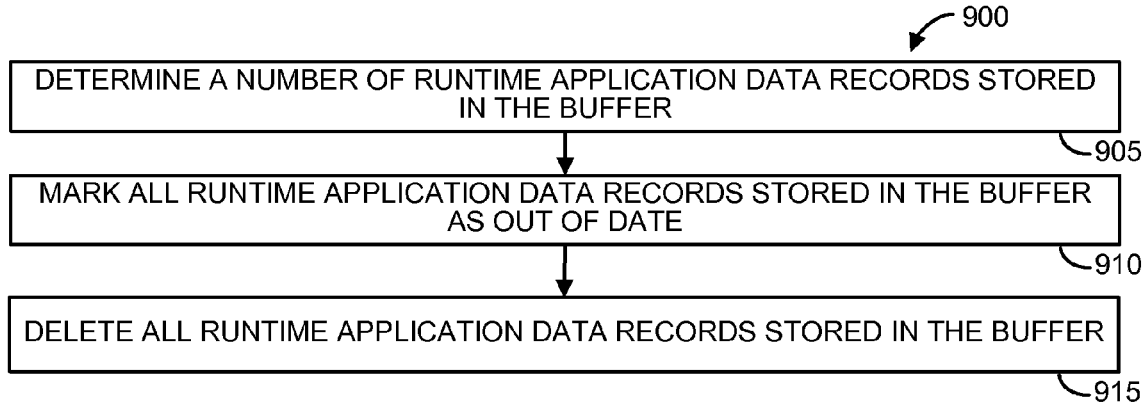
FIG. 9 is a flowchart illustrating various operations of a data list manager in accordance with an example embodiment.

FIG. 9 is a flowchart illustrating various operations 900 of a data list manager in accordance with an example embodiment. The operations 900 illustrated in FIG. 9, as with any of the method operations described herein, may be implemented individually or in conjunction with other operations of the techniques described herein, as appropriate. In the system 100, the buffer controller 130 may carry out, the operations 900 shown in FIG. 9, for example. In other embodiments, other entities of a data list manager may carry out the operations 900.

At block 905, the operations 900 include determining a number of application runtime data records stored in a buffer, such as the buffer 135 in FIG. 1. At block 910, the operations 900 include marking all application runtime data records stored a buffer (e.g., the buffer 135) as being out of date. At block 915, the operations 900 include deleting all application runtime data records stored in a buffer (e.g., the buffer 135).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system comprising:
a processor; and
a non-transitory machine-readable medium having instructions stored thereon, the instructions, when executed by the processor, cause the computing system to implement:
 a data list manager configured to store application runtime data and provide the application runtime data to a consumer application for presentation to a user, the data list manager comprising:
  a data supplier configure to:
   receive first metadata defining a data record structure for application runtime data records;
   receive second metadata defining identifiers for the application runtime data records; and
   retrieve application runtime data records requested by the consumer application;
  a buffer controller operationally coupled with the data supplier, the buffer controller being configured to:
   provision a data buffer for storing the retrieved application runtime data records in accordance with the first metadata and the second metadata;
   receive and store identifiers corresponding with the application runtime data records in the data buffer in accordance with the provisioning;
   receive and store the application runtime data records retrieved by the data supplier; and
   mark application runtime data records stored in the data buffer as out of date;
  an event processor operationally coupled with the buffer controller, the event processor being configured to:
   receive events indicating changes to persistently stored application runtime data records; and
   provide notification of the events to the buffer controller for marking the application runtime data records as out of date.

2. The computer system of claim 1, wherein:
the data supplier is further configured to receive third metadata defining enriched application data fields for the application runtime data records, the enriched application data fields each being a user readable field corresponding with one or more respective coded fields of the application runtime data records; and
the buffer controller is further configured to store, in the data buffer, the enriched application data fields in conjunction with their respective application runtime data records.

3. The computer system of claim 1, wherein the data list manager is further configured to:
receive a request to sort the application runtime data records corresponding with the identifiers, the sort request including indications of one or more sort columns and corresponding sort directions;
retrieve each of the application runtime data records corresponding with the identifiers, including retrieving modified application runtime data records marked as out of date in the buffer; and
sort the application runtime data records in accordance with the sort request.

4. The computer system of claim 1, wherein the data list manager is further configured to:
   determine a number of application runtime data records stored in the buffer;
   mark all application runtime data records stored in the buffer as out of date; and
   delete all application runtime data records stored in the buffer.

5. The computer system of claim 1, wherein the data list manager is further configured to:
   receive a request for one or more of the stored application runtime data records;
   determine whether each of the one or more application runtime data records of the request are stored in the buffer and are up to date;
   in the event that each of the one or more application runtime data records of the request are stored in the buffer and are up to date:
      provide the one or more application runtime data records of the request to the consumer application for display to the user; and
   in the event that each of the one or more application runtime data records of the request are not stored in the buffer or are not up to date:
      retrieve and store, in the buffer, application runtime data records of the request that are not stored in the buffer;
      retrieve and store, in the buffer, updated application runtime data records of the request that are indicated as being out of date in the buffer; and
      provide the one or more application runtime data records of the request to the consumer application for display to the user.

6. A method comprising:
   receiving, at a data list manager, a set of identifiers associated, respectively, with one or more persistently stored structured data records;
   storing, by the data list manager, the set of identifiers;
   receiving, at the data list manager, a request for one or more of the structured data records;
   retrieving, by the data list manager, the one or more requested structured data records;
   storing, by the data list manager, the retrieved data records in correspondence with their respective identifiers;
   providing, by the data list manager, the enhanced data fields for display to a user;
   retrieving, by the data list manager, one or more respective enhanced data fields for each of the retrieved data records, each enhanced data field including a human readable value corresponding with one or more respective coded fields of the retrieved data records;
   storing, by the data list manager, the retrieved data records in correspondence with their respective identifiers; and
   providing, by the data list manager, the retrieved data records for display to the user.

7. The method of claim 6, wherein the request for one of more of the structured data records comprises one of the following: a specific data record identifier and a set of data record identifiers.

8. The method of claim 6, further comprising:
   receiving, at the data list manager, an indication that one or more of the persistently stored data records has been modified;
   marking, by the data list manager, the retrieved and stored data records corresponding with the changed data records as being out of date;
   receiving, by the data list manager, a request for one or more of the modified data records;
   retrieving, by the data list manager, the one or more requested modified data records;
   storing, by the data list manager, the modified data records in correspondence with their respective identifiers; and
   providing, by the data list manager, the modified data records for display to the user.

9. The method of claim 8, providing, by the data list manager, the indication that one or more of the persistently stored data records has been modified to a consumer application program operationally coupled with the data list manager.

10. The method of claim 6, further comprising:
    receiving, at the data list manager, a second request for one or more of the structured data records;
    determining whether each of the one or more data records of the second request are stored in the data list manager and are up to date;
    in the event that each of the one or more data records of the second request are stored in the data list manager and are up to date:
       providing, by the data list manager, the one or more data records of the second request for display to the user; and
    in the event that each of the one or more data records of the second request are not stored in the data list manager or are not up to date:
       retrieving and storing, by the data list manager, data records of the second request that are not stored in the data list manager;
       retrieving and storing, by the data list manager, updated data records of the second request that are indicated as being out of date in the data list manager; and
       providing, by the data list manager, the data records of the second request for display to the user.

11. The method of claim 10, further comprising:
    retrieving and storing, by the data list manager:
       one or more respective enhanced data fields for each of the data records of the second request that were not stored in the data list manager; and
       one or more respective enhanced data fields for each of the updated data records of the second request that were indicated as being out of date in the data list manager,
       wherein each enhanced data field includes a human readable value corresponding with a respective coded field of the data records of the second request; and
    providing, by the data list manager, the enhanced data fields for display to the user.

12. The method of claim 6, further comprising:
    receiving, at the data list manager, a request to sort, in the data list manager, the data records associated with the set of identifiers, the request including indications of one or more sort columns and corresponding sort directions;
    determining, by the data list manager, if each of the data records associated with the set of identifiers are stored in the data list manager and are up to date;
    in the event that each of the data records associated with the set of identifiers are stored in the data list manager and are up to date, sorting, in the data list manager, the data records associated with the set of identifiers in accordance with the sort request; and
    in the event that each of the data records associated with the set of identifiers are not stored in the data list manager or are not up to date:
       retrieving and storing, by the data list manager, data records associated with the set of identifiers that are not stored in the data list manager;

retrieving and storing, by the data list manager, updated data records associated with the set of identifiers that are indicated as being out of date in the data list manager; and sorting, in the data list manager, the data records associated with the set of identifiers in accordance with the sort request.

13. The method of claim 6, wherein storing the retrieved data records in correspondence with their respective identifiers comprises storing the retrieved records as respective rows of a table in a data buffer of the data list manager.

14. The method of claim 13, wherein the request for one of more of the structured data records comprises one of the following: a line number interval of the table including one or more lines and a list of individual line numbers of the table.

15. The method of claim 6, further comprising:

receiving, at the data list manager, an indication that one or more of the persistently stored data records has been deleted; and deleting, by the data list manager, the retrieved and stored data records corresponding with the deleted data records.

16. A method comprising:

receiving, at a data list manager, first metadata defining a data record structure;

provisioning, by the data list manager, a data buffer to store data records in respective rows, wherein the columns of each row are provisioned in accordance with the first metadata;

registering, by the data list manager, with a data service provider to receive notification when data records stored in the data service provider are changed;

receiving, at the data list manager, a set of identifiers associated, respectively, with one or more persistently stored structured data records having a structure in accordance with the first metadata;

storing, by the data list manager, the set of identifiers;

receiving, at the data list manager, a request for one or more of the structured data records;

retrieving, by the data list manager, the one or more requested data records;

storing, by the data list manager, the retrieved data records in respective rows of the data buffer in correspondence with their respective identifiers; and providing, by the data list manager, the retrieved data records for display to a user.

17. The method of claim 16, wherein the structured data records are homogeneous.

18. The method of claim 16, further comprising:

requesting, by the data list manager, second metadata defining one or more enriched data fields, the enriched data fields being configured to store human readable values corresponding with respective coded fields of the data records;

further provisioning, by the data list manager, the data buffer to store the enriched data fields with the respective rows, wherein the columns of the enriched data fields for each row are provisioned in accordance with the second metadata;

requesting, by the data list manager, conversion of the respective coded fields of each retrieved data record to respective human readable values;

storing, by the data list manager, the human readable values in corresponding enriched data fields of respective rows of the data buffer; and providing, by the data list manager, the human readable values for display to a user.

19. The method of claim 16, further comprising:

requesting, by the data list manager, conversion of one or more coded fields of each retrieved data record from a respective coded field to a respective human readable field;

storing, by the data list manager, the converted fields for each data record with respective rows of the data records in the data buffer; and providing, by the data list manager, the human readable fields for display to the user.

* * * * *